United States Patent
Thompson

(10) Patent No.: US 8,561,315 B2
(45) Date of Patent: Oct. 22, 2013

(54) SOLAR GRAIN DRYING SYSTEM AND METHOD

(75) Inventor: Barry R. Thompson, Dublin, OH (US)

(73) Assignee: Legacy Design, LLC, Dublin, OH (US)

( * ) Notice: Subject to any disclaimer, the term of this patent is extended or adjusted under 35 U.S.C. 154(b) by 562 days.

(21) Appl. No.: 12/792,185

(22) Filed: Jun. 2, 2010

(65) Prior Publication Data

US 2011/0296708 A1  Dec. 8, 2011

(51) Int. Cl.
*F26B 3/06* (2006.01)
*F26B 21/10* (2006.01)

(52) U.S. Cl.
USPC .............. 34/93; 34/524; 34/169; 34/219

(58) Field of Classification Search
USPC ............. 34/93, 522, 524, 169, 219; 126/585, 126/591, 592
See application file for complete search history.

(56) References Cited

U.S. PATENT DOCUMENTS

| | | | |
|---|---|---|---|
| 3,919,784 A * | 11/1975 | Tonn ............................. 34/93 |
| 3,979,838 A | 9/1976 | Tonn |
| 4,045,880 A | 9/1977 | Steffen |
| 4,109,395 A | 8/1978 | Huang |
| 4,169,459 A | 10/1979 | Ehrlich |
| 4,189,848 A | 2/1980 | Ko et al. |
| 4,198,956 A | 4/1980 | Soleau, Jr. |
| 4,253,244 A | 3/1981 | Kranzler |
| 4,285,143 A | 8/1981 | Hufford et al. |
| 4,368,583 A | 1/1983 | Bauermeister |
| 4,391,046 A | 7/1983 | Pietraschke |
| 4,432,147 A * | 2/1984 | Chen et al. ................ 34/542 |
| 4,514,914 A * | 5/1985 | Kitzmiller ................ 34/93 |
| 4,519,379 A | 5/1985 | Schultz |
| 4,524,528 A | 6/1985 | Ehlers |
| 4,553,530 A | 11/1985 | Mizukami et al. |
| 4,556,047 A | 12/1985 | Clavier |
| 4,566,433 A | 1/1986 | Amundsen |
| 4,834,066 A | 5/1989 | Collins et al. |
| 4,930,229 A | 6/1990 | Moser |
| 4,987,883 A | 1/1991 | Watkins et al. |
| 5,028,299 A | 7/1991 | Guidat et al. |
| 5,557,859 A | 9/1996 | Baron |
| 5,899,199 A | 5/1999 | Mills |
| 5,915,376 A | 6/1999 | McLean |
| 6,131,565 A | 10/2000 | Mills |
| 6,167,638 B1 | 1/2001 | Vavro et al. |
| 6,209,223 B1 | 4/2001 | Dinh |
| 6,473,220 B1 | 10/2002 | Clikeman et al. |
| 6,637,428 B2 | 10/2003 | Winston |

(Continued)

FOREIGN PATENT DOCUMENTS

| WO | WO2007109899 | 10/2007 |
|---|---|---|
| WO | 2008/120178 A1 | 10/2008 |
| WO | 2008/122968 A1 | 10/2008 |
| WO | 2008/146269 A1 | 12/2008 |

*Primary Examiner* — Jiping Lu
(74) *Attorney, Agent, or Firm* — Roger A. Gilcrest

(57) ABSTRACT

The invention includes an apparatus, system, and method for the drying of particulate agricultural matter, especially particulate crops, such grains. The present invention provides a crop particulate (i.e., grain) drying system utilizing solar energy to heat a heat transfer fluid or solution within concomitant forced-air and radiant heat systems which pass heated air through a crop particulate material contained within a conventional crop silo or bin. Electricity demand may be met through utilization of solar photovoltaic panels backed up by connection to an external power source (i.e. power utility).

24 Claims, 6 Drawing Sheets

(56) References Cited

U.S. PATENT DOCUMENTS

| | | |
|---|---|---|
| 6,819,465 B2 | 11/2004 | Clikeman et al. |
| 7,240,029 B2 | 7/2007 | Kallestad |
| 7,263,934 B2 | 9/2007 | Copeland et al. |
| 7,410,104 B2 | 8/2008 | MacPherson |
| 7,434,332 B2 | 10/2008 | Morton et al. |
| 7,461,466 B2 | 12/2008 | Morton et al. |
| 2004/0060250 A1 | 4/2004 | Sukup et al. |
| 2004/0154184 A1 | 8/2004 | Bloemendaal |
| 2006/0111035 A1 | 5/2006 | Kallestad |
| 2006/0123655 A1 | 6/2006 | Valfiorani |
| 2006/0130357 A1 | 6/2006 | Long |
| 2007/0234587 A1 | 10/2007 | Pierson et al. |
| 2008/0216823 A1 | 9/2008 | Kmetovicz et al. |
| 2009/0025709 A1 | 1/2009 | Bogdan et al. |
| 2009/0094853 A1 | 4/2009 | Noyes et al. |
| 2009/0211567 A1* | 8/2009 | Thomasson .................. 126/585 |
| 2010/0031953 A1 | 2/2010 | Penev et al. |
| 2010/0065044 A1 | 3/2010 | Reader et al. |
| 2010/0065104 A1 | 3/2010 | Baruh |

\* cited by examiner

SOLAR GRAIN DRYING SYSTEM AND METHOD

RELATED APPLICATION DATA

Not Applicable.

TECHNICAL FIELD

The present invention relates generally to grain drying systems and methods of grain drying structure utilizing solar energy.

BACKGROUND OF THE INVENTION

The present invention relates generally to grain drying structures and more particularly to grain drying structures and systems utilizing solar energy.

It is desirable to be able to dry grain efficiently and relatively quickly, rather than rely upon drying in the fields which often achieves varied and unpredictable results, and carries with it the risks of adverse weather conditions that may cause rot or keep the farmer from harvesting the grain as desired.

Typically, grain may be dried in silos using typical ventilation and drying arrangements with propane used to heat the drying air flow that is circulated through the grain, often accompanied by agitation. However, propane is very expensive and often serves as an economic deterrent to silo drying. Accordingly, there remains a need for solar grain drying systems that make efficient use of solar energy while being capable of continuous operation of the system as solar output varies within a treatment cycle.

Further, there is a need for grain drying equipment utilizing all the advantages of other energy sources while being adapted to be used in combination with solar heat as the source of energy.

It is also desirable to provide a silo system for use in grain drying that better maintains the temperature of the drying air so as to make the drying process more uniform and less susceptible to changes in ground temperature or other weather conditions.

The present invention represents an improvement over prior art apparatus and methods, such as those described in U.S. Pat. Nos. 3,919,784; 3,979,838; 4,045,880; 4,109,395; 4,169,459; 4,198,956; 4,253,244; 4,285,143; 4,368,583; 4,391,046; 4,524,528; 5,557,859; 5,028,299; 6,209,223; 6,167,638; 7,240,029; 7,461,466; 7,434,332; and 7,263,934, and in U.S. Published Patent Applications Serial Nos. 20040060250, 20040154184, 20060111035, 20060123655, 20060130357, 20070234587, and 20090094853, all of which are hereby incorporated herein by reference. The present invention may be used in accordance with such prior art systems and methods.

The present invention addresses remaining needs in the art including the efficient use of energy in solar grain drying, and provides benefits in the form of more uniform temperature in the drying air flow.

SUMMARY OF THE INVENTION

In general terms, the present invention includes a system and method for the drying of particulate agricultural matter, especially particulate crops, such as grains.

Silo Grain Drying System with Alternative Heat Transfer Fluid Sources

The present invention includes a system for drying a particulate agricultural product in a silo, the system comprising: (a) a silo having an interior space, the silo comprising an air conduit adapted to provide drying air to the interior space; (b) an air blower adapted to provide forced air into the air conduit; (c) at least one heat exchanger in heat transfer contact with the air conduit, the heat exchanger adapted to accept a heat transfer fluid; (d) a heat transfer fluid storage tank adapted to accept and store a heat transfer fluid, and to supply the heat transfer fluid to the heat exchanger; (e) an evacuated tube solar panel adapted to heat a heat transfer fluid and to supply the heat transfer fluid alternatively to the heat exchanger and to the heat transfer fluid storage tank; (f) a photovoltaic solar panel adapted to generate electricity and to supply electricity to the heat transfer fluid storage tank; (g) a heating unit adapted to heat the heat transfer fluid in the heat fluid storage tank, the heating unit adapted to use electricity generated by the photovoltaic solar panel; and (h) an optional controller unit adapted to determine whether the heat transfer fluid supplied to the heat exchanger by the evacuated tube solar panel is at a temperature insufficient to maintain the forced air at a pre-determined temperature, and in such event to signal the heat transfer fluid storage tank to supply the heat transfer fluid to the heat exchanger.

In another embodiment, the present invention includes a system for drying a particulate agricultural product in a silo, the system comprising (a) a silo having an interior space, the silo comprising an air conduit adapted to provide drying air to the interior space; (b) an air blower adapted to provide forced drying air through the air conduit; (c) at least one heat exchanger in heat transfer contact with the air conduit, the heat exchanger adapted to accept a heat transfer fluid; (d) a heat transfer fluid storage tank adapted to accept and store a heat transfer fluid, and to supply the heat transfer fluid to the at least one heat exchanger and to receive the heat transfer fluid from the at least one heat exchanger; (e) an evacuated tube solar panel adapted to heat a heat transfer fluid and to supply the heat transfer fluid to the heat transfer fluid storage tank and to receive the heat transfer fluid from the heat transfer fluid storage tank; (f) a photovoltaic solar panel adapted to generate electricity and to supply electricity to the heat transfer fluid storage tank; (g) a heating unit adapted to heat the heat transfer fluid in the heat fluid storage tank, the heating unit adapted to use electricity generated by the photovoltaic solar panel; (h) a silo air sensor adapted to determine whether the drying air is at a pre-determined temperature; and (i) a controller unit adapted to receive a signal from the silo air sensor and to control the flow of the heat transfer fluid from the heat transfer fluid storage tank in response to the signal.

The system may additionally comprise a valve controlling the flow of heat transfer fluid to said evacuated tube solar panel from said heat transfer fluid storage tank and an evacuated tube solar panel sensor adapted to determine whether the evacuated tube solar panel is at a temperature sufficient to maintain the heat transfer fluid at a pre-determined temperature and, in such condition, to signal the controller unit to initiate the flow of the heat transfer fluid from the heat transfer fluid storage tank to the evacuated tube solar panel.

The system may additionally comprise a valve controlling the flow of heat transfer fluid to the at least one heat exchanger from the heat transfer fluid storage tank and wherein the silo air sensor is adapted to determine whether the heat transfer fluid supplied to the heat exchanger by the heat transfer fluid storage tank is at a temperature insufficient to maintain the forced drying air at a pre-determined temperature and, in such event, to signal the heat transfer fluid storage tank to supply heat transfer fluid to the at least one heat exchanger.

The silo air sensor may also be adapted to determine whether the forced drying air is at a pre-determined temperature, and in the even it is not, to signal the heat transfer fluid storage tank to supply heat transfer fluid to the at least one heat exchanger As an optional feature, the system may additionally include a heat transfer fluid storage tank sensor adapted to determine whether the heat transfer fluid in the heat transfer fluid storage tank is at a temperature insufficient to maintain drying air in the plenum within the silo at a pre-determined temperature and, in such event, to signal the controller unit to turn on electricity from the photovoltaic solar panel to the heating unit to heat the heat transfer fluid; or, optionally in the alternative, if such condition is not present, to allow the photovoltaic solar panel to provide energy to the local electricity grid.

In a further optional embodiment, the system may additionally be connected to a local electricity grid, and the photovoltaic solar panel may be adapted to supply electricity alternatively to the heating unit and to the local electricity grid, and wherein the heat transfer fluid storage tank sensor is adapted to determine whether the heat transfer fluid in the heat transfer fluid storage tank is at a temperature sufficient to maintain the drying air in the plenum within the silo at a pre-determined temperature and, in such event, to signal the controller unit to cause the photovoltaic solar panel to supply electricity to the local electricity grid.

The system may also include an air recirculation conduit adapted to accept air from the interior space of the silo from a relatively higher output position, and to provide a flow of drying air into the interior space of the silo from a relatively lower input position through the air blower disposed in the air conduit and adapted to provide forced drying air through the air conduit.

In those variations of the invention additionally featuring radiant heating in the silo floor, the silo may additionally comprise: (i) at least one lateral wall and a roof; and (ii) a floor portion, the floor portion comprising: (1) a base of an insulative material; (2) an aggregate floor laid above the base and in heat transfer contact with a plenum within the silo, and (3) a radiant heating conduit adapted to accept heat transfer fluid from the heat transfer fluid storage tank. It is preferred that this embodiment additionally include a valve controlling the flow of heat transfer fluid to the radiant heating conduit from the heat transfer fluid storage tank, and a radiant heating conduit sensor adapted to determine whether the heat transfer fluid supplied to the radiant heating conduits by the heat transfer fluid storage tank is at a temperature insufficient to maintain drying air in the plenum within the silo at a pre-determined temperature and, in such event, to signal the controller unit to open the valve to allow the heat transfer fluid to flow through the radiant heating conduit.

It is preferred that the controller unit is adapted to determine whether the heat transfer fluid supplied to the heat exchanger by the heat transfer fluid storage tank is at a temperature insufficient to maintain the forced air at a pre-determined temperature and, in such event, to signal the photovoltaic solar panel adapted to supply electricity to the heat transfer fluid storage tank heat transfer fluid storage tank to supply the heat transfer fluid to the heat exchanger.

Although described herein as a system wherein the heat transfer fluid storage tank is placed between the evacuated tube solar panel and the heat exchanger, other embodiments may include the use of a separate heat transfer fluid storage tank and evacuated tube solar panel, with individual conduits and valves adapted to provide alternative flow as needed to the heat exchanger(s), depending upon conditions.

The system may also be connected to a local electricity grid, such that the photovoltaic solar panel is adapted to supply electricity alternatively to supply electricity to the heat transfer fluid storage tank and to the local electricity grid.

As used herein, controller unit may be provided with a microprocessor to accept and analyze feedback signals, and to initiate control signals as described herein, in order to carry out the many required or optional functions described herein. Such a microprocessor may be provided with programmed logic instructions to perform the feedback analysis functions and control functions described herein. As may be appreciated by those of ordinary skill, the feedback and control features of the present invention may be carried out by any of a wide variety of means, including the use of varying assay points within the system, the use of equivalent system parameters, ranges and thresholds, etc.

A Method of Drying Using Alternative Heat Transfer Fluid Sources

The present invention also includes a method for drying a particulate agricultural product in a silo, the method comprising: (a) placing a particulate agricultural product in a silo having an interior space, the silo comprising an air conduit adapted to circulate drying air within the interior space; (b) operating an air blower adapted to provide forced air into the air conduit, the air blower having a heat exchanger in heat transfer contact with the air conduit, the heat exchanger adapted to accept a heat transfer fluid; (c) providing a heat transfer fluid to the heat exchanger, the heat exchanger being provided with the heat transfer fluid from a heat transfer fluid storage tank adapted to accept and store a heat transfer fluid, the heat transfer fluid storage tank dispensing heat transfer fluid to the heat exchanger alternatively by: (i) the heat transfer fluid storage tank comprising a heating unit, the heating unit heating the heat transfer fluid using electricity generated by a photovoltaic solar panel, and dispensing the heat transfer fluid to the heat exchanger; or (ii) the heat transfer fluid storage tank accepting heat transfer fluid from an evacuated tube solar panel adapted to heat the heat transfer fluid, and dispensing the heat transfer fluid to the heat exchanger; and (d) operating the blower and continuing to circulate drying air at sufficient temperature within the interior space and for sufficient time so as to reduce the moisture content of the particulate agricultural product.

The method may optionally additionally comprise determining whether the heat transfer fluid supplied to the heat exchanger by the evacuated tube solar panel is at a temperature insufficient to maintain the forced air at a pre-determined temperature, and in such event to signal the heat transfer fluid storage tank to supply the heat transfer fluid to the heat exchanger.

Also optional is the additional step of determining whether the electricity is required to maintain the heat transfer fluid at a predetermined temperature and, in the event it is not, alternatively supplying electricity to a local electricity grid.

Silo Design for Grain Drying System with Recirculation System and Radiant Floor

Another preferred system of the present invention is a system for drying a particulate agricultural product in a silo, the system comprising: (a) a silo having an interior space, the silo comprising: (i) at least one lateral wall and a roof; (ii) a floor portion, the floor portion comprising: (1) a base of an insulative material; (2) an aggregate floor laid above the base, and (3) a radiant heating conduit; (b) an air recirculation conduit adapted to accept air from the interior space of the silo from a relatively higher output position, and to provide a flow of air into the interior space of the silo from a relatively lower input position; (c) an air blower in the air recirculation conduit adapted to provide forced air through the air recirculation conduit; and (d) at least one heat exchanger in the air recirculation conduit and in heat transfer contact with the forced air, the heat exchanger adapted to accept a heat transfer fluid.

The system may preferably include an additional interior air conduit adapted to circulate drying air within the interior space, such as in the form of a perforated stirring bar.

It is also preferred that there be a first heat exchanger disposed upstream of the blower and a second heat exchanger disposed downstream of the blower.

The system optionally includes a thermal collector such as an evacuated tube solar panel adapted to heat a heat transfer fluid and to supply the heat transfer fluid to the at least one heat exchanger. It is also preferred that the thermal collector, such as an evacuated tube solar panel, be adapted to heat a heat transfer fluid and to supply the heat transfer fluid to the radiant heating conduits.

The heat transfer fluid storage tank may be adapted to accept and store a heat transfer fluid, and to supply the heat transfer fluid to the heat exchanger, and an evacuated tube solar panel may be provided to heat a heat transfer fluid and to supply the heat transfer fluid alternatively to the heat exchanger and to the heat transfer fluid storage tank, as well as optionally to the radiant heating conduits.

It is also preferred that the system additionally includes a photovoltaic solar panel adapted to generate electricity and to supply electricity to the heat transfer fluid storage tank, a heating unit adapted to heat the heat transfer fluid in the heat fluid storage tank, the heating unit adapted to use electricity generated by the photovoltaic solar panel; and a controller unit adapted to determine whether the heat transfer fluid supplied to the heat exchanger by the evacuated tube solar panel is at a temperature insufficient to maintain the forced air at a pre-determined temperature, and in such event to signal the heat transfer fluid storage tank to supply the heat transfer fluid to the heat exchanger. The controller unit preferably is adapted to determine whether the heat transfer fluid supplied to the heat exchanger by the heat transfer fluid storage tank is at a temperature insufficient to maintain the forced air at a pre-determined temperature, and in such event to signal the photovoltaic solar panel adapted to supply electricity to the heat transfer fluid storage tank to supply the heat transfer fluid to the heat exchanger.

The photovoltaic solar panel may be adapted to supply electricity alternatively to supply electricity to the heat transfer fluid storage tank and to the local electricity grid.

In a preferred embodiment, the present invention provides a crop particulate (grain) drying system utilizing solar energy to heat a heat transfer fluid or solution within concomitant forced-air and radiant heat systems which pass heated air through a crop particulate (grain) material contained within a conventional crop silo (bin) adjacent to a service structure housing these systems. Solar thermal energy is harnessed by an evacuated (glass) tube solar thermal panel and transferred to a fluid solution contained within a mechanical piping system. This thermal energy is exchanged to the forced-air and radiant heat systems via the thermal storage and transmission tank. Forced-air is heated via fan coils and delivered to an under floor air plenum within the crop silo (bin) situated upon a concrete foundation heated by a radiant heat loop. This heated air is passed through a perforated floor and through the crop particulate material. Air is re-circulated via return air duct, continuously or intermittently (based upon temperature and humidity demands). Vents within the crop silo (bin) allow ambient air to be introduced to the system. Systems are used in combination to increase efficiencies and lessen or eliminate demand for external sources of energy. The crop storage itself is utilized as a contributing element within the network of systems, increasing efficiency and reducing energy losses. Excess heat and, or electricity may be used to meet other on-site demands for these resources.

Electricity demand is met through utilization of solar photovoltaic panels backed up by connection to an external power source (i.e. power utility). Battery backup and, or an engine-driven generator may be used to supplant connection to the electrical grid. Other renewable energy sources such as wind energy or biomass could be utilized to meet on-site demand, especially in remote geographies without easy access to energy utilities.

DETAILED DESCRIPTION OF THE PREFERRED EMBODIMENTS

Figure 1:
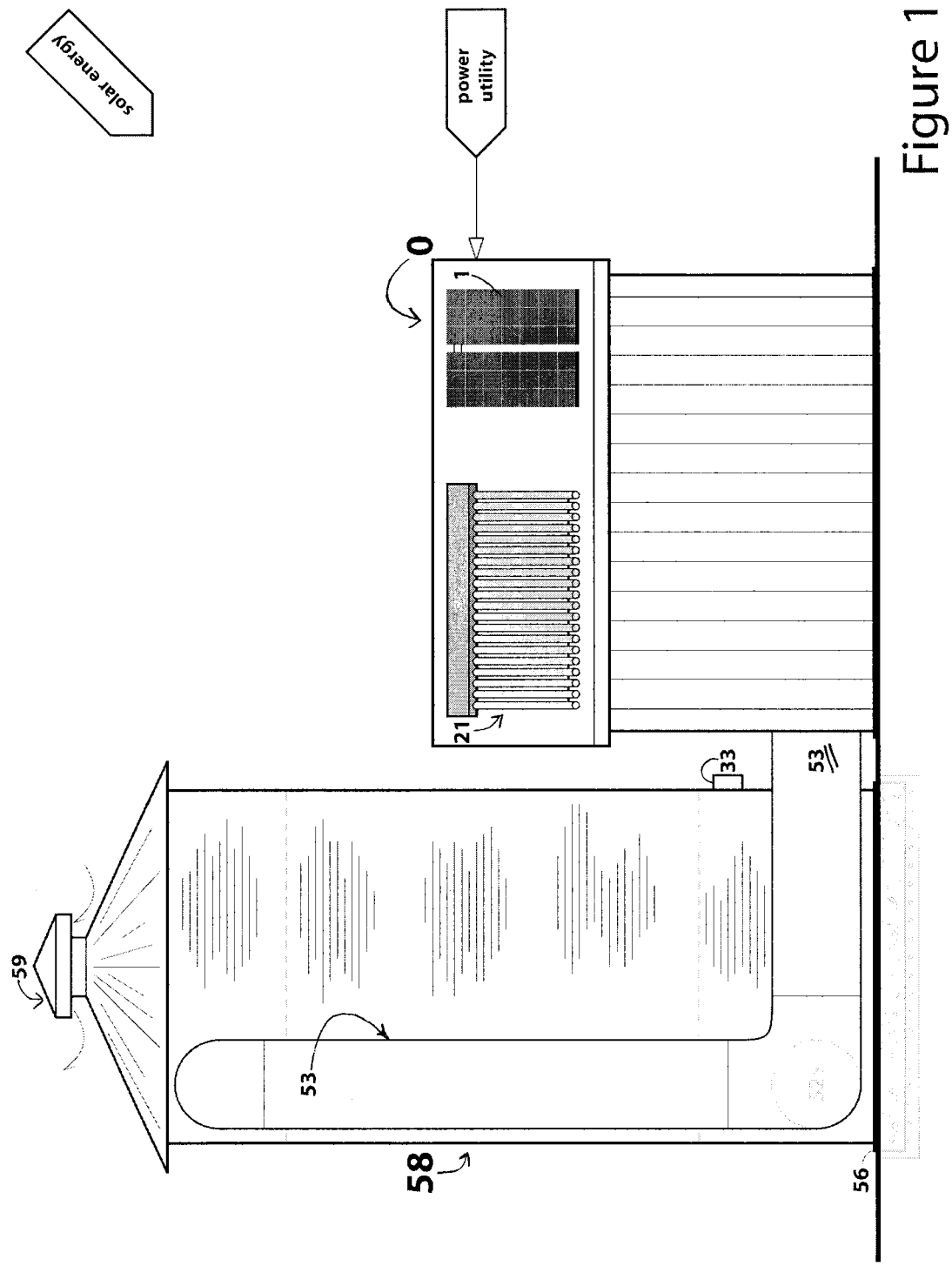
FIG. 1 is a side elevation view of a system for drying grain using solar energy in accordance with one embodiment of the present invention.

In accordance with the foregoing summary, the following provides a detailed description of the preferred embodiment, which is presently considered to be the best mode thereof.

FIGS. 1-6 may be understood through reference to the following numerals indicating the associated components and features throughout, and wherein such numerals refer to the same components and features throughout the Figures.

0. service structure
1. solar photovoltaic panels
2. DC power lines (+/−)
3. solar PV disconnect
4. AC/DC power inverter
5. AC power utility disconnect
6. AC power lines
7. AC smart meter
8. electrical service panel
9. grounding
10. AC electrical feed to solar thermal system
11. AC electrical feed to forced-air and radiant heating systems
12. solar thermal temperature and pump controller
13. sensor wire to solar thermal panel temperature sensor
14. solar thermal panel temperature sensor
15. sensor wire to thermal storage and transfer tank temperature sensor
16. thermal storage and transfer tank temperature sensor
17. AC electrical feed to solar thermal heat transfer fluid circulating pump
18. solar thermal heat transfer fluid circulating pump 19. AC electrical feed to supplementary heating element
20. supplementary heating element
21. evacuated (glass) tube solar thermal panel
22. heat transfer fluid return line
23. expansion tank
24. in-line check valve
25. isolation valve
26. thermal storage and transfer tank (system filled with a heat transfer fluid)
27. pressure relief valve
28. drain-down and fill valve
29. heat transfer fluid supply line to solar thermal panel
30. heat exchangers
31. fan and pump controller for air and radiant heating systems
32. sensor wire to crop silo (bin) humidistat-thermostat
33. humidistat-thermostat
34. AC electrical feed to fan coil heat transfer fluid circulating pump
35. fan coil heat transfer fluid circulating pump
36. AC electrical feed to radiant heat transfer fluid circulating pump
37. radiant heat transfer fluid circulating pump
38. AC electrical feed to fan (air handling unit)
39. fan (air handling unit)
40. heat transfer fluid supply line to fan coils
41. thermometer
42. flow meter
43. fan coils
44. heat transfer fluid return line from fan coils
45. heat transfer fluid supply line to radiant heat loop
46. radiant heat loop
47. heat transfer fluid return line from radiant heat loop
48. supply air (insulated) duct
49. manual air volume damper
50. supply air outlet
51. air plenum
52.(a) return air inlet
52.(b) alternate location
53. return air (insulated) duct
54. air filter
55. rigid insulation
56. concrete slab
57. perforated floor
58. crop silo (bin)
59. fill hatch and air vent
60. crop particulate material (grain, legumes, etc.)

FIG. 1 is a side perspective view of a system for drying grain using solar energy in accordance with one embodiment of the present invention. FIG. 1 shows an elevation view of a system in accordance with one embodiment of the present invention that may be comprise the major elements in a crop particulate (grain) drying system utilizing an evacuated (glass) tube solar thermal heating system 21 in conjunction with a solar photovoltaic electrical system comprising solar photovoltaic panels. An optional service structure 0 housing mechanical equipment supplies radiant heating fluid (such as in an housed tank, not shown, see thermal storage and transfer tank 26 described in FIG. 3, for receiving heated heat transfer fluid from evacuated (glass) tube solar thermal panel 21) and heated air to a crop silo (or bin) 58.

For the purpose of directly heating the heat transfer fluid, any thermal collectors appropriate to the desired application may be used. There are basically three types of thermal collectors: flat-plate, evacuated-tube, and concentrating. A flat-plate collector, the most common type, is an insulated, weatherproofed box containing a dark absorber plate under one or more transparent or translucent covers. Evacuated-tube collectors are made up of rows of parallel, transparent glass tubes. Each tube consists of a glass outer tube and an inner tube, or absorber, covered with a selective coating that absorbs solar energy well but inhibits radiative heat loss. The air is withdrawn ("evacuated") from the space between the tubes to form a vacuum, which eliminates conductive and convective heat loss. Concentrating collector applications are usually parabolic troughs that use mirrored surfaces to concentrate the sun's energy on an absorber tube (called a receiver) containing a heat-transfer fluid. The evacuated (glass) tube solar panels are preferred and may be those described in WO 2008/122968 A1, U.S. Pat. Nos. 6,819,465; 6,473,220, in U.S. Published Patent Applications Serial Nos. 20100065044 (all of which are incorporated herein by reference), or otherwise commercially available from Kingspan Solar Inc. of Jessup, Md., Thermo Technologies of Columbia, Md., and Viessmann Werke of Allendorf, Germany. Other collectors include those described in U.S. Published Patent Applications Serial Nos. 20100065104, 20090025709, 20090223550 and 20080216823 (all of which are incorporated herein by reference).

In a preferred embodiment, FIG. 1 also shows silo (or bin) 58 which may be placed upon concrete slab 56, and is preferably provided with fill hatch and air vent 59 and humidistat/thermostat 33. Also shown is return air (insulated) duct 53 that is serviced by a return inlet 52(a) (see FIG. 5) that may be in an alternate location 52(b).

Figure 2:
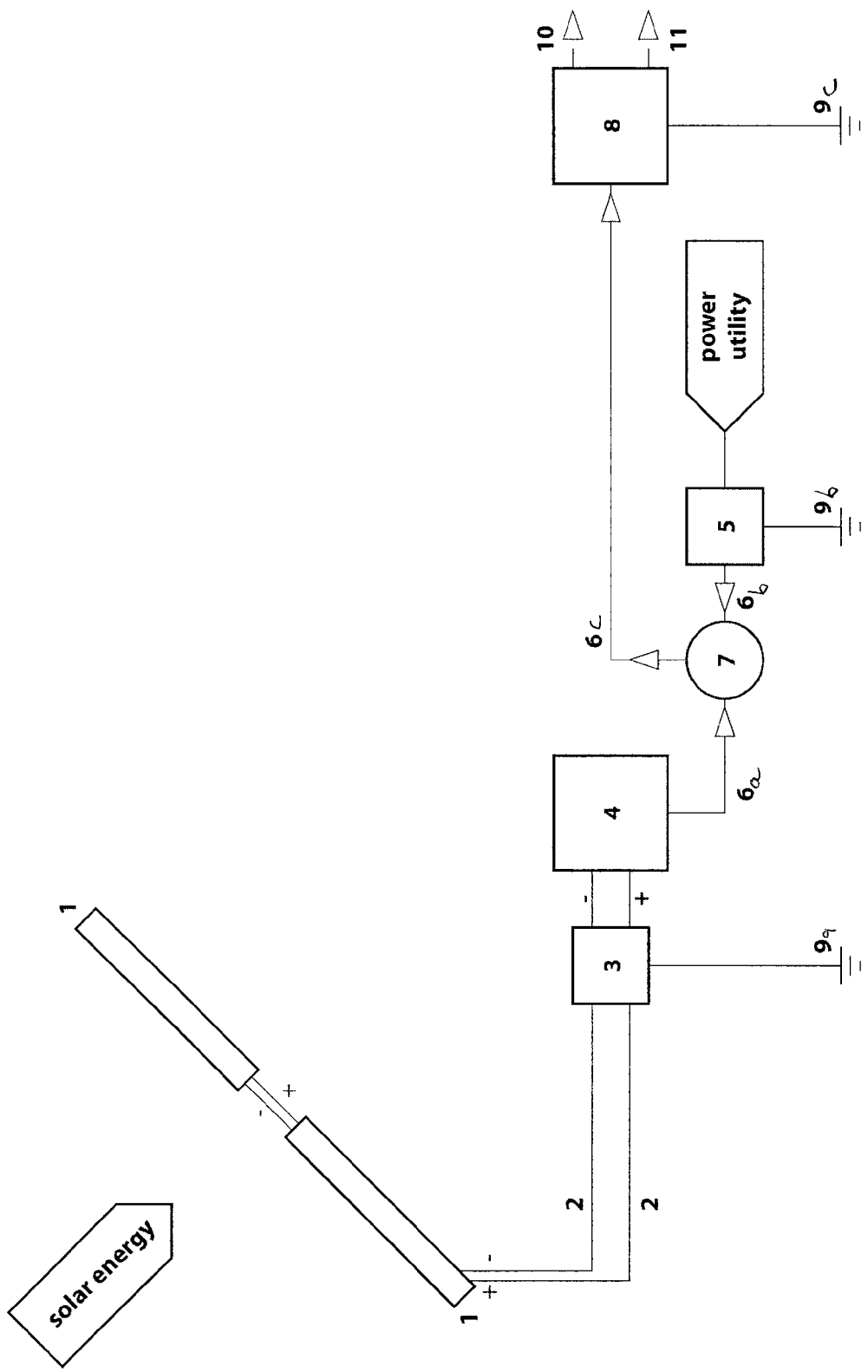
FIG. 2 is a general schematic of a system for drying grain using solar energy in accordance with one embodiment of the present invention.

Figure is a schematic illustration of a solar photovoltaic electrical system in relation to on-site electrical loads 10 and an external power utility. FIG. 2 shows the arrangement and cooperation of several components of the system of the present invention. FIG. 2 shows solar energy incident upon solar photovoltaic panels 1 from which DC power lines (+/−) 2 conduct electricity to solar PV disconnect 3 which is grounded at grounding point 9a. Solar PV disconnect 3 is further connected to AC/DC power inverter 4 which supplies AC smart meter 7 with AC current via AC power line 6a, which in turn is connected to AC power utility disconnect 5 and electrical service panel 8 via AC power lines 6b and 6c, respectively. AC power utility disconnect 5 and electrical service panel 8 also preferably have individual ground points 9b and 9c, respectively. AC power utility disconnect 5 is also adapted to receive electric power, such as from the local power utility, as needed. Electrical service panel 8 in turn supplies electric power to AC electrical feed 10 to solar thermal system, and to AC electrical feed 11 to forced-air and radiant heating systems 11, as needed. The AC electrical feed to solar thermal system 10 preferably is used to heat a storage tank of heat transfer fluid as a heat source back up in the event the thermal collector system fails to provide sufficient energy to the heat exchanger(s) associated with the air inlet as described herein.

Figure 3:
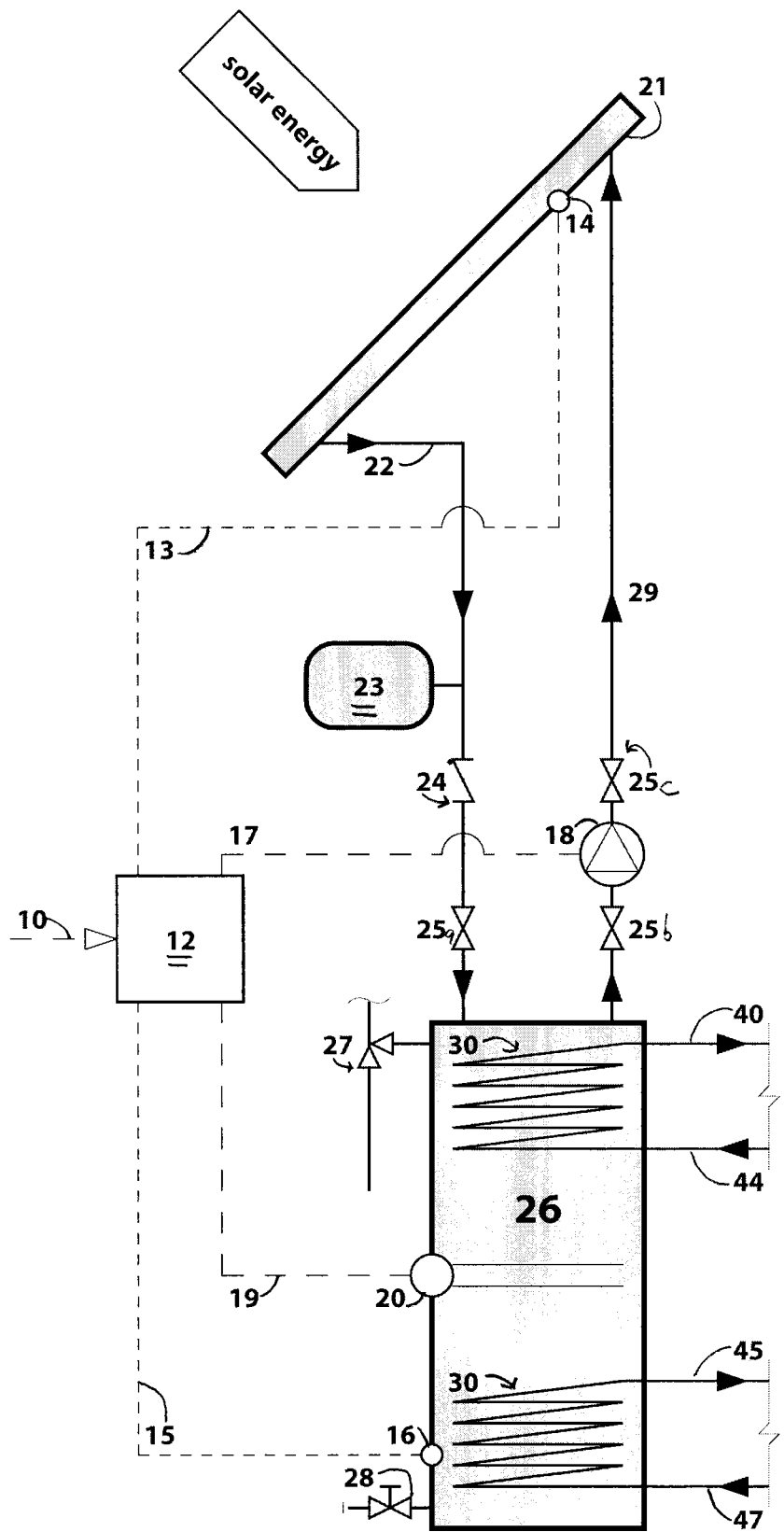
FIG. 3 is a schematic of a heat transfer fluid and passive solar portion of a system for drying grain using solar energy in accordance with one embodiment of the present invention.

FIG. 3 is a schematic illustration of an evacuated (glass) tube solar thermal heating system containing a fluid utilized to transfer heat via heat exchangers 30 to a heating fan coil (air) system and radiant heating system.

FIG. 3 shows evacuated (glass) tube solar thermal heating system 21 connected to heat transfer fluid return line 22 which proceeds through in-line check valve 24 and isolation valve 25a to thermal storage and transfer tank 26 (system filled with a heat transfer fluid). Optionally, an expansion tank 23 may be provided as shown. FIG. 3 also shows heat exchangers 30 with heat transfer fluid supply line 40 to fan coils 43 (see FIG. 4), heat transfer fluid return line 44 from fan coils 43, heat transfer fluid supply line 45 to radiant heat loop 46, and heat transfer fluid return line 47 from radiant heat loop 46. FIG. 3 also shows the pressure relief valve 27 and drain-down and fill valve 28 serving tank 26. The thermal storage and transfer tank 26 typically will be provided with heat transfer fluid supply line 29 to return heat transfer fluid to solar thermal panel 21. This fluid supply line 29 is governed by isolation valve 25b, solar thermal heat transfer fluid circulating pump 18 and isolation valve 25c. Solar thermal heat transfer fluid circulating pump 18 may be serviced by AC electrical feed 17 from solar thermal temperature and pump controller 12 so as to be adapted to pump return solar thermal heat transfer fluid to solar thermal panel 21.

Solar thermal temperature and pump controller 12 may also be connected by a sensor wire to solar thermal panel temperature sensor 14 to monitor the temperature of the fluid in the solar thermal panel 21, in order to determine whether AC power is required to be supplied to the thermal storage and transfer tank 26 for supplementary heating from the AC electrical feed 10. The solar thermal temperature and pump controller 12 is also signaled by sensor wire 15 which monitors the temperature of to thermal storage and transfer tank via thermal storage and transfer tank temperature sensor 16. This sensor monitors the temperature of the hat transfer fluid to determine whether the heat transfer fluid requires supplementary heating if it is not being kept within the desired temperature range or at a given threshold by the fluid from the solar thermal panel 21. If not, the solar thermal temperature and pump controller 12 may control the system by supplying supplementary heating. Thermal storage and transfer tank 26 may also be provided with supplementary heating element 20 which is adapted to be served by AC electrical feed 19 from solar thermal temperature and pump controller 12. Solar thermal temperature and pump controller 12 receives an AC electrical feed 10 for the solar thermal system.

Typically and preferably, thermal storage and transfer tank temperature sensor 16 determines whether the fluid in the thermal storage and transfer tank is at sufficient temperature to provide sufficient heat to the heat exchangers to heat the drying air to the desired temperature (typically 140-200 F., preferably about 170 F.) and, if not, to cause fluid from the solar thermal panel to be brought into the thermal storage and transfer tank to increase the overall temperature of the fluid in the thermal storage and transfer tank. In addition, it is preferred that the sensors and controller also determine that there is sufficient differential between the temperature of the fluid in the thermal storage and transfer tank and the fluid in the solar thermal panel to prevent/defeat fluid transfer in the event the fluid in the solar thermal panel is not yet at sufficient temperature to increase the overall temperature of the fluid in the thermal storage and transfer tank. Thus, the solar thermal panel temperature sensor 14 and thermal storage and transfer tank temperature sensor 16 outputs are coordinated by the controller to assure that effective fluid transfer is made to increase the overall temperature of the fluid in the thermal storage and transfer tank, as the system requires.

Figure 4:
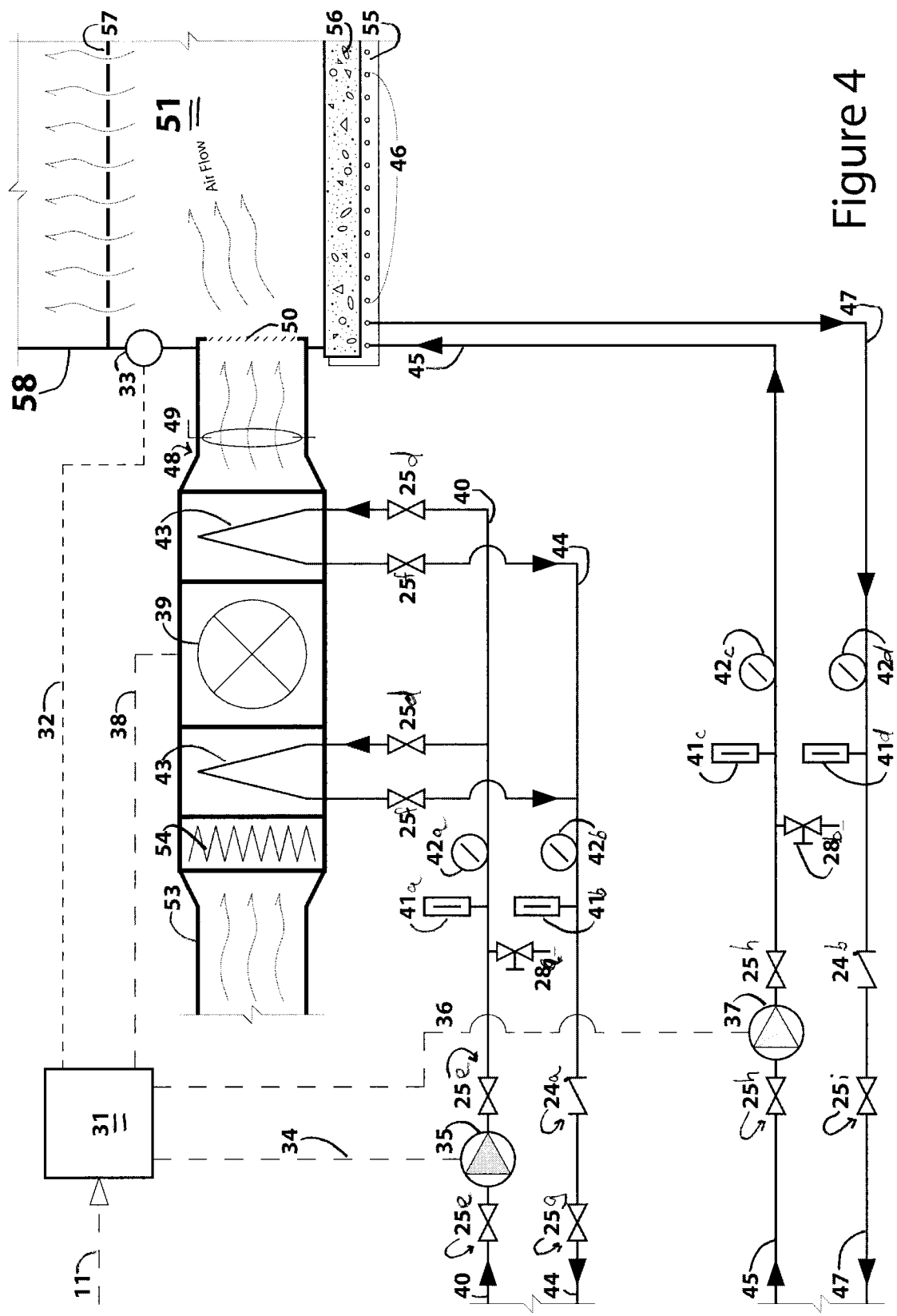
FIG. 4 is a schematic of an air conduit and heat exchanger portion of a system, with optional radiant silo heating, for a system for drying grain using solar energy in accordance with one embodiment of the present invention.

Through this arrangement, heat transfer fluid may be supplied to the heat exchanger system as described in FIG. 4. The availability of the heat transfer fluid allows for the continuous effective operation of the grain drying system, whether during times of effectively high sunlight or during periods where the passive solar panels do not provide sufficient energy to the heat exchangers, in which case the heat transfer is actively heated by energy from the photovoltaic panels.

The humidistat-thermostat 33 monitors air plenum 51 of silo 58 and provides control feedback through sensor wire 32 to fan and pump controller 31 which governs the flow of air through conduit 53 by fan 39, and the flow of heat transfer fluid into the heat exchanger system as described herein. The AC electrical feed 11 supplies AC power to forced-air and radiant heating system fan and pump controller 31. The controller 31 is adapted to the heat transfer fluid supplied to the heat exchanger by the heat transfer fluid storage tank is at a temperature insufficient to maintain the forced air at a predetermined temperature, and in such event to signal the photovoltaic solar panel adapted to supply electricity to the heat transfer fluid storage tank heat transfer fluid storage tank to supply the heat transfer fluid to the heat exchanger.

The system may be used in conjunction with a local electricity grid, with the photovoltaic solar panel being adapted to supply electricity alternatively to supply electricity to the heat transfer fluid storage tank and to the local electricity grid.

FIG. 4 is a schematic illustration of mechanical systems supplying heated air to a crop silo (bin) 58 via an air handling unit (i.e., fan 39) blowing air through heating fan coils 43 within a ducted system. Fan 39 receives control signals from fan and pump controller 31 for the air and radiant heating systems, and this control system in turn provides AC electrical feed 38.

FIG. 4 shows air conduit 53, which in this embodiment is an insulated return air duct from the upper portion of silo 58 as shown in FIG. 1. This conduit contains fan 39 and two heat exchangers 43, as well as optional air filter 54. The heat exchangers 43 receive heat transfer fluid from heat transfer fluid supply line 40 governed by isolation valves 25d, as well as thermometer 41a and flow meter 42a that serve to provide feed back control upon the in-coming heat transfer fluid flow. Also shown in heat transfer fluid supply line 40 is drain-down and fill valve 28a, and fan coil heat transfer fluid circulating pump 35 that receives control signals from fan and pump controller 31 governing the air and radiant heating systems, which in turn provides AC electrical feed 34 to fan coil heat transfer fluid circulating pump. Fan coil heat transfer fluid circulating pump 35 is also preferably provided with isolation valves 25e.

The heat exchangers 43 release heat transfer fluid from heat transfer fluid heat transfer fluid return line 44 governed by isolation valves 25f, as well as thermometer 41b and flow meter 42b that serve to provide feed back control over the out-going heat transfer fluid flow. Also shown in heat transfer fluid return line 44 is in line check valve 24a and downstream isolation valve 25g.

In addition, a radiant heating system circulates heat transfer fluid through a radiant heat loop 46 underneath same crop silo (bin) 58 via heat transfer fluid supply return lines 45 and 47. The radiant heat loop 46 receives heat transfer fluid from heat transfer fluid supply line 45 which is provided with thermometer 41c and flow meter 42c that serve to provide feed back control upon the in-coming heat transfer fluid flow. Also shown in heat transfer fluid supply line 45 is drain-down and fill valve 28b, and fan coil heat transfer fluid circulating pump 37 that receives control signals from fan and pump controller 31 governing the air and radiant heating systems, which in turn provides AC electrical feed 36 to fan coil heat transfer fluid circulating pump. Radiant heat loop heat transfer fluid circulating pump 37 is also preferably provided with isolation valves 25h.

Radiant heat loop 46 releases heat transfer fluid from heat transfer fluid heat transfer fluid return line 47 governed by check valve 24b and isolation valve 25i, as well as thermometer 41d and flow meter 42d that serve to provide feed back control over the out-going heat transfer fluid flow.

FIG. 4 also shows the position of insulated supply air duct 48 and manual air volume damper 49.

Figure 5:
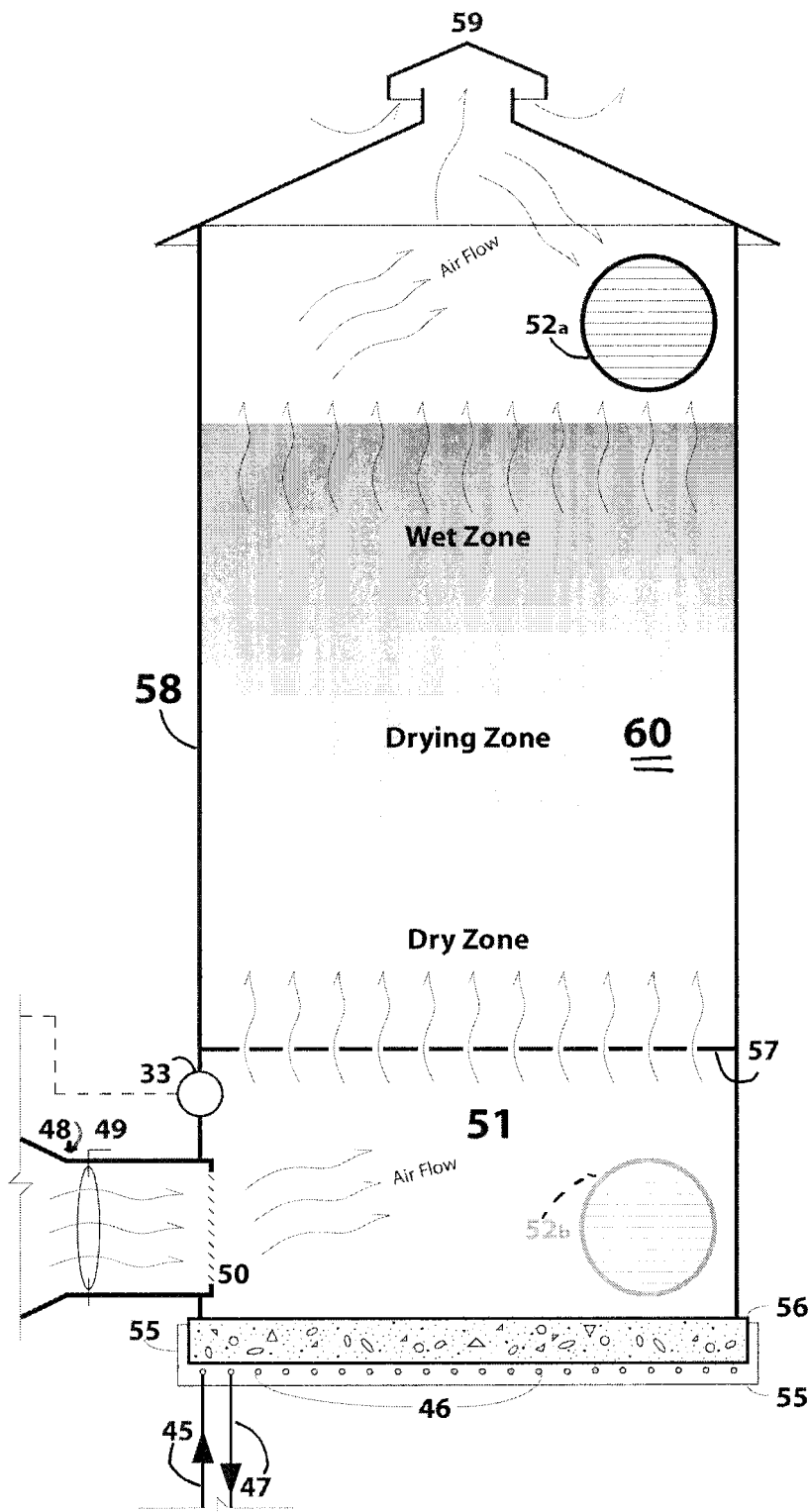
FIG. 5 is a detailed elevation view of a silo and air conduit, with optional radiant silo heating, for a system for drying grain using solar energy in accordance with one embodiment of the present invention.

FIG. 5 is a cross-sectional view (not-to-scale) depicting the transmission of heated air to a crop silo (bin) 58 via both a forced-air system and a radiant heating system associated therewith. The heat is produced by a solar thermal heating system in conjunction with a solar photovoltaic electrical system and is transmitted to the crop particulate material 60 via an under floor air plenum 51 situated over a concrete slab 56 heated by a radiant heat loop 46 isolated from heat loss to the earth by rigid insulation 55. FIG. 5 shows a detailed view of the interior of silo 58, showing insulated supply air duct 48 and manual air volume damper 49 connecting the air conduit 53 to the air plenum 51. This view also shows an alternative location of return air inlet 52b. FIG. 5 also shows the perforated floor 57 through which the warmed air flow proceeds to contact the grain, such as a crop particulate material (grain, legumes, etc.) above this point. FIG. 5 also shows the direction of the air flow through a drying zone to a wet zone and further into return air conduit 52a, or exiting through fill hatch/air vent 59. The temperature of the air in the plenum 51 is further maintained by action of the radiant heating system heating floor that may include rigid insulation 55 and concrete or aggregate slab 56.

FIG. 5 is a schematic illustration of mechanical systems supplying heated air to a crop silo (bin) 58 via an air handling unit (fan) 39 blowing air through heating fan coils 43 within a ducted system. In addition, a radiant heating system circulates heat transfer fluid through a radiant heat loop 46 underneath same crop silo (bin) 58 via heat transfer fluid supply/return lines 45 and 47.

Figure 6:
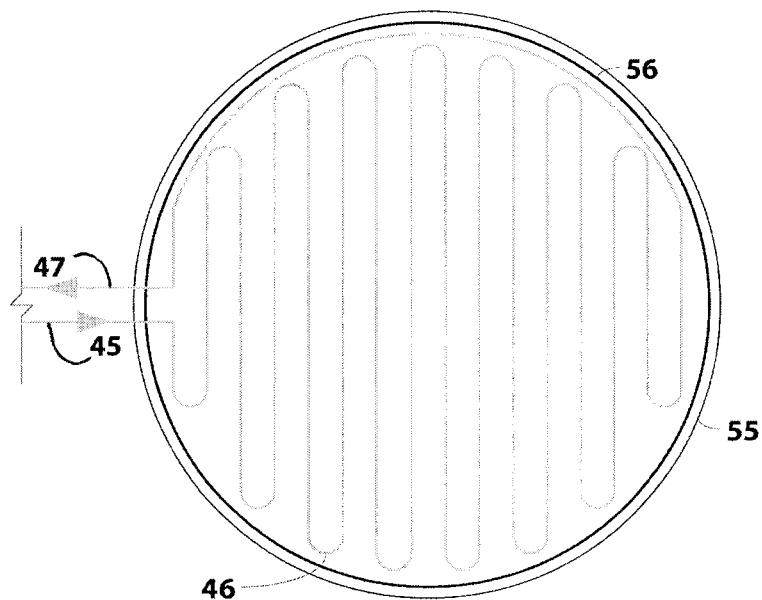
FIG. 6 is a detailed plan view of a silo floor with optional radiant heating, for a system for drying grain using solar energy in accordance with one embodiment of the present invention.

FIG. 6 shows a detailed plan view of radiant heat loop underneath the concrete slab 56. The exact sizing may be different for each system, depending upon volume and heat capacity of each system. Typically, the radiant tubing is oxygen-barrier ½ inch pex tubing. FIG. 6 shows the loop in plan view. The tubing normally will be spaced at about 8 inches, again depending upon the typical ground temperature and the desired operating temperature of the air flow. In a preferred embodiment, the aggregate underlayment (base) for the concrete slab would be underneath a layer of rigid insulation. In this way, the concrete slab 56 is used as a thermal mass for heat storage and transmission in a configuration as shown.

It is apparent that while specific embodiments of the invention are disclosed, various modifications to the apparatus or parameters of the process may be made which will be within the spirit and scope of the invention. Therefore, the spirit and scope of the present invention should be determined by reference to the claims below.

What is claimed is:

1. A system for drying a particulate agricultural product in a silo, said system comprising:
   a. a silo having an interior space, said silo comprising an air conduit adapted to provide drying air within to said interior space;
   b. an air blower adapted to provide forced drying air through said air conduit;
   c. at least one heat exchanger in heat transfer contact with said air conduit, said heat exchanger adapted to accept a heat transfer fluid;
   d. a heat transfer fluid storage tank adapted to accept and store a heat transfer fluid, and to supply said heat transfer fluid to said at least one heat exchanger and to receive said heat transfer fluid from said at least one heat exchanger;
   e. an evacuated tube solar panel adapted to heat a heat transfer fluid and to supply said heat transfer fluid to said heat transfer fluid storage tank and to receive said heat transfer fluid from said heat transfer fluid storage tank;
   f. a photovoltaic solar panel adapted to generate electricity and to supply electricity to said heat transfer fluid storage tank;
   g. a heating unit adapted to heat the heat transfer fluid in said heat fluid storage tank, said heating unit adapted to use electricity generated by said photovoltaic solar panel;
   h. a silo air sensor adapted to determine whether said drying air is at a pre-determined temperature;
   i. a controller unit adapted to receive a signal from said silo air sensor and to control the flow of said heat transfer fluid from said heat transfer fluid storage tank in response to said signal; and
   j. a valve controlling the flow of heat transfer fluid to said evacuated tube solar panel from said heat transfer fluid storage tank and an evacuated tube solar panel sensor adapted to determine whether said evacuated tube solar panel is at a temperature sufficient to maintain said heat transfer fluid at a pre-determined temperature and, in such condition, to signal said controller unit to initiate the flow of said heat transfer fluid from said heat transfer fluid storage tank to said evacuated tube solar panel.

2. A system according to claim 1 additionally comprising a valve controlling the flow of heat transfer fluid to said at least one heat exchanger from said heat transfer fluid storage tank and wherein said silo air sensor is adapted to determine whether said forced drying air is at a pre-determined temperature, and in the even it is not, to signal said heat transfer fluid storage tank to supply heat transfer fluid to said at least one heat exchanger.

3. A system according to claim 1 additionally comprising a heat transfer fluid storage tank sensor adapted to determine whether said heat transfer fluid in said heat transfer fluid storage tank is at a temperature insufficient to maintain drying air in said plenum within said silo at a pre-determined temperature and, in such event, to signal said controller unit to turn on electricity from said photovoltaic solar panel to said heating unit to heat said heat transfer fluid.

4. A system according to claim 1 additionally comprising a local electricity grid, and wherein said photovoltaic solar panel is adapted to supply electricity alternatively to heating unit and to said local electricity grid, and wherein said heat transfer fluid storage tank sensor is adapted to determine whether said heat transfer fluid in said heat transfer fluid storage tank is at a temperature sufficient to maintain said drying air in said plenum within said silo at a pre-determined temperature and, in such event, to signal said controller unit to cause said photovoltaic solar panel to supply electricity to said local electricity grid.

5. A system according to claim 1 additionally comprising an air recirculation conduit adapted to accept air from said interior space of said silo from a relatively higher output position, and to provide a flow of drying air into said interior space of said silo from a relatively lower input position through said air blower disposed in said air conduit and adapted to provide forced drying air through said air conduit.

6. A system according to claim 1 wherein said a silo comprises:
   i. at least one lateral wall and a roof;
   ii. a floor portion, said floor portion comprising:
      1. a base of an insulative material; and
      2. an aggregate floor laid above said base and in heat transfer contact with a plenum within said silo, and
      3. a radiant heating conduit adapted to accept heat transfer fluid from said heat transfer fluid storage tank.

7. A system according to claim 6 additionally comprising a valve controlling the flow of heat transfer fluid to said radiant heating conduit from said heat transfer fluid storage tank, and a radiant heating conduit sensor adapted to determine whether said heat transfer fluid supplied to said radiant heating conduits by said heat transfer fluid storage tank is at a temperature insufficient to maintain drying air in said plenum within said silo at a pre-determined temperature and, in such event, to signal said controller unit to open said valve to allow said heat transfer fluid to flow through said radiant heating conduit.

8. A system according to claim 1, additionally comprising an interior air conduit adapted to circulate drying air within said interior space.

9. A system according to claim 1, wherein said at least one heat exchanger comprises a first heat exchanger disposed upstream of said blower and a second heat exchanger disposed downstream of said blower.

10. A system for drying a particulate agricultural product in a silo, said system comprising:
   a. a silo having an interior space, said silo comprising an air conduit adapted to provide drying air to said interior space;
   b. an air blower adapted to provide forced drying air through said air conduit;
   c. at least one heat exchanger in heat transfer contact with said air conduit, said heat exchanger adapted to accept a heat transfer fluid;
   d. a heat transfer fluid storage tank adapted to accept and store a heat transfer fluid, and to supply said heat transfer fluid to said at least one heat exchanger and to receive said heat transfer fluid from said at least one heat exchanger;
   e. an evacuated tube solar panel adapted to heat a heat transfer fluid and to supply said heat transfer fluid to said heat transfer fluid storage tank and to receive said heat transfer fluid from said heat transfer fluid storage tank;
   f. a photovoltaic solar panel adapted to generate electricity and to supply electricity to said heat transfer fluid storage tank;
   g. a heating unit adapted to heat the heat transfer fluid in said heat fluid storage tank, said heating unit adapted to use electricity generated by said photovoltaic solar panel;
   h. a silo air sensor adapted to determine whether said drying air is at a pre-determined temperature;
   i. a controller unit adapted to receive a signal from said silo air sensor and to control the flow of said heat transfer fluid from said heat transfer fluid storage tank in response to said signal; and
   j. a valve controlling the flow of heat transfer fluid to said at least one heat exchanger from said heat transfer fluid storage tank and wherein said silo air sensor is adapted to determine whether said forced drying air is at a pre-determined temperature, and in the event it is not, to signal said heat transfer fluid storage tank to supply heat transfer fluid to said at least one heat exchanger.

11. A system according to claim 10, additionally comprising a heat transfer fluid storage tank sensor adapted to determine whether said heat transfer fluid in said heat transfer fluid storage tank is at a temperature insufficient to maintain drying air in said plenum within said silo at a pre-determined temperature and, in such event, to signal said controller unit to turn on electricity from said photovoltaic solar panel to said heating unit to heat said heat transfer fluid.

12. A system according to claim 10, additionally comprising a local electricity grid, and wherein said photovoltaic solar panel is adapted to supply electricity alternatively to heating unit and to said local electricity grid, and wherein said heat transfer fluid storage tank sensor is adapted to determine whether said heat transfer fluid in said heat transfer fluid storage tank is at a temperature sufficient to maintain said drying air in said plenum within said silo at a pre-determined temperature and, in such event, to signal said controller unit to cause said photovoltaic solar panel to supply electricity to said local electricity grid.

13. A system according to claim 10, additionally comprising an air recirculation conduit adapted to accept air from said interior space of said silo from a relatively higher output position, and to provide a flow of drying air into said interior space of said silo from a relatively lower input position through said air blower disposed in said air conduit and adapted to provide forced drying air through said air conduit.

14. A system according to claim 10, wherein said a silo comprises:
   i. at least one lateral wall and a roof;
   ii. a floor portion, said floor portion comprising:
      1. a base of an insulative material; and
      2. an aggregate floor laid above said base and in heat transfer contact with a plenum within said silo, and
      3. a radiant heating conduit adapted to accept heat transfer fluid from said heat transfer fluid storage tank.

15. A system according to claim 14, additionally comprising a valve controlling the flow of heat transfer fluid to said radiant heating conduit from said heat transfer fluid storage tank, and a radiant heating conduit sensor adapted to determine whether said heat transfer fluid supplied to said radiant heating conduits by said heat transfer fluid storage tank is at a temperature insufficient to maintain drying air in said plenum within said silo at a pre-determined temperature and, in such event, to signal said controller unit to open said valve to allow said heat transfer fluid to flow through said radiant heating conduit.

16. A system according to claim 10, additionally comprising an interior air conduit adapted to circulate drying air within said interior space.

17. A system according to claim 10, wherein said at least one heat exchanger comprises a first heat exchanger disposed upstream of said blower and a second heat exchanger disposed downstream of said blower.

18. A system for drying a particulate agricultural product in a silo, said system comprising:
   a. a silo having
      i. an interior space;
      ii. an air conduit adapted to provide drying air to said interior space;
      iii. at least one lateral wall and a roof; and
      iv. a floor portion, said floor portion comprising:
         1. a base of an insulative material;
         2. an aggregate floor laid above said base and in heat transfer contact with a plenum within said silo; and
         3. a radiant heating conduit adapted to accept heat transfer fluid from said heat transfer fluid storage tank;
   b. an air blower adapted to provide forced drying air through said air conduit;
   c. at least one heat exchanger in heat transfer contact with said air conduit, said heat exchanger adapted to accept a heat transfer fluid;
   d. a heat transfer fluid storage tank adapted to accept and store a heat transfer fluid, and to supply said heat transfer fluid to said at least one heat exchanger and to receive said heat transfer fluid from said at least one heat exchanger;
   e. an evacuated tube solar panel adapted to heat a heat transfer fluid and to supply said heat transfer fluid to said heat transfer fluid storage tank and to receive said heat transfer fluid from said heat transfer fluid storage tank;

f. a photovoltaic solar panel adapted to generate electricity and to supply electricity to said heat transfer fluid storage tank;

g. a heating unit adapted to heat the heat transfer fluid in said heat fluid storage tank, said heating unit adapted to use electricity generated by said photovoltaic solar panel;

h. a silo air sensor adapted to determine whether said drying air is at a pre-determined temperature; and i. a controller unit adapted to receive a signal from said silo air sensor and to control the flow of said heat transfer fluid from said heat transfer fluid storage tank in response to said signal.

19. A system according to claim 18, additionally comprising a valve controlling the flow of heat transfer fluid to said radiant heating conduit from said heat transfer fluid storage tank, and a radiant heating conduit sensor adapted to determine whether said heat transfer fluid supplied to said radiant heating conduits by said heat transfer fluid storage tank is at a temperature insufficient to maintain drying air in said plenum within said silo at a pre-determined temperature and, in such event, to signal said controller unit to open said valve to allow said heat transfer fluid to flow through said radiant heating conduit.

20. A system according to claim 18, additionally comprising a heat transfer fluid storage tank sensor adapted to determine whether said heat transfer fluid in said heat transfer fluid storage tank is at a temperature insufficient to maintain drying air in said plenum within said silo at a pre-determined temperature and, in such event, to signal said controller unit to turn on electricity from said photovoltaic solar panel to said heating unit to heat said heat transfer fluid.

21. A system according to claim 18, additionally comprising a local electricity grid, and wherein said photovoltaic solar panel is adapted to supply electricity alternatively to heating unit and to said local electricity grid, and wherein said heat transfer fluid storage tank sensor is adapted to determine whether said heat transfer fluid in said heat transfer fluid storage tank is at a temperature sufficient to maintain said drying air in said plenum within said silo at a pre-determined temperature and, in such event, to signal said controller unit to cause said photovoltaic solar panel to supply electricity to said local electricity grid.

22. A system according to claim 18, additionally comprising an air recirculation conduit adapted to accept air from said interior space of said silo from a relatively higher output position, and to provide a flow of drying air into said interior space of said silo from a relatively lower input position through said air blower disposed in said air conduit and adapted to provide forced drying air through said air conduit.

23. A system according to claim 18, additionally comprising an interior air conduit adapted to circulate drying air within said interior space.

24. A system according to claim 18, wherein said at least one heat exchanger comprises a first heat exchanger disposed upstream of said blower and a second heat exchanger disposed downstream of said blower.

* * * * *